United States Patent [19]

Ngo

[11] 3,924,250

[45] Dec. 2, 1975

[54] MAGNETIC CORE MATRIX AND WINDING PATTERN FOR MASS CORE MEMORY

[75] Inventor: Charles C. M. Ngo, Woodland Hills, Calif.

[73] Assignee: Litton Systems, Inc., Beverly Hills, Calif.

[22] Filed: Apr. 19, 1974

[21] Appl. No.: 462,267

[52] U.S. Cl. .................... 340/174 CR; 340/174 DC; 340/174 M; 340/174 NC

[51] Int. Cl.² .................... G11C 5/06; G11C 11/06

[58] Field of Search ................ 340/174 CR, 174 AB, 174 RC, 340/174 DC, 174 M, 174 NC

[56] References Cited

UNITED STATES PATENTS

| | | | |
|---|---|---|---|
| 3,021,511 | 2/1962 | Vinal | 340/174 M |
| 3,161,860 | 12/1964 | Grooteboer | 340/174 DC |
| 3,543,256 | 11/1970 | Genke | 340/174 CR |
| 3,646,531 | 2/1972 | Marahashi | 340/174 CR |
| 3,675,224 | 7/1972 | Ninomiya et al. | 340/174 CR |

*Primary Examiner*—James W. Moffitt

[57] ABSTRACT

A mass core memory having a plurality of magnetic core matrices wherein each magnetic core matrix has a plurality of x-axis word wires and a plurality of y-axis digit wires that are paired and interwoven with periodic double cross-over regions so that a continuous sense wire can be easily threaded through selected memory cores at the word and digit wire intersections, and the winding pattern of the magnetic core matrix eliminates cross coupling and cancels delta noise.

7 Claims, 4 Drawing Figures

MAGNETIC CORE MATRIX AND WINDING PATTERN FOR MASS CORE MEMORY

BACKGROUND OF THE INVENTION

A 2½D core memory module or matrix is known in the art[1] and generally is an orthogonal matrix of x-axis and y-axis wires.

[1]T. J. Gilligan, "2½D High Speed Memory Systems — Past, Present, and Future," IEEE TRANSACTIONS ON ELECTRONIC COMPUTERS, Vol. EC-15, No. 4, August, 1966.

In the matrix, one dimension serves a dual function as a data and address dimension and the other dimension functions as a word dimension. The data and address dimension is designated as a y-axis digit dimension, and the word dimension is designated as a x-axis word dimension.

A memory element such as a magnetic memory core is positioned at selected intersections of the x-axis and y-axis wires and threaded by the x- and y-wires. Each core is also threaded by a sense wire that, as a sense wire winding, can exhibit one of several known geometric patterns.[2]

[2]U.S. Pat. Nos. 3,238,516; 3,284,784; 3,303,481; 3,381,282; 3,543,256.

Known sense wire winding patterns still present problems for which circuit designers, manufacturers, and users seek better solutions. Several of these problems are (1) a need for better cancellation of common mode noise, (2) a need for better differential sensing to complement the cancellation, and (3) a need for a better threading pattern to substantially reduce or eliminate mechanical damage to a sense wire during threading.

OBJECTS OF THE INVENTION

Accordingly, it is an object of the invention to provide a new and improved core memory matrix.

It is an object of the invention to provide a core memory matrix for mass core storage.

It is an object of the invention to provide a core memory matrix having an improved sense wire winding pattern.

It is an object of the invention to provide a core memory matrix having better cancellation of common mode noise.

It is an object of the invention to provide a core memory matrix having better differential sensing.

It is an object of the invention to provide a core memory matrix having an improved sense wire winding pattern that substantially reduces or eliminates mechanical damage to a sense wire during a threading operation.

SUMMARY OF THE INVENTION

Briefly, in accordance with the invention, a core memory matrix is provided having adjacent rows of x-axis oriented word wires and interwoven first and second digit wire loops in columns of y-axis oriented bit wire columns generally transverse to the x-axis rows. The digit wire loops are periodically flip-flopped to reverse the y-axis columnar relationship of the loops. A magnetic memory core at each x-y intersection is threaded by one word wire and one portion of one digit wire. A continuous sense wire loop threaded through each magnetic core has a bight and first and second legs with the first leg threaded in alternate and opposed directions along selected first ones $n_1$ $n_4$ $n_5$ $n_8$ $n_9$ . . . $n_x$ of the y-axis columns, and with the second leg threaded in alternate and opposed directions along selected second ones $n_2$ $n_3$ $n_6$ $n_7$ . . . $n_y$ $n_z$ of the y-axis columns.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figure 1:
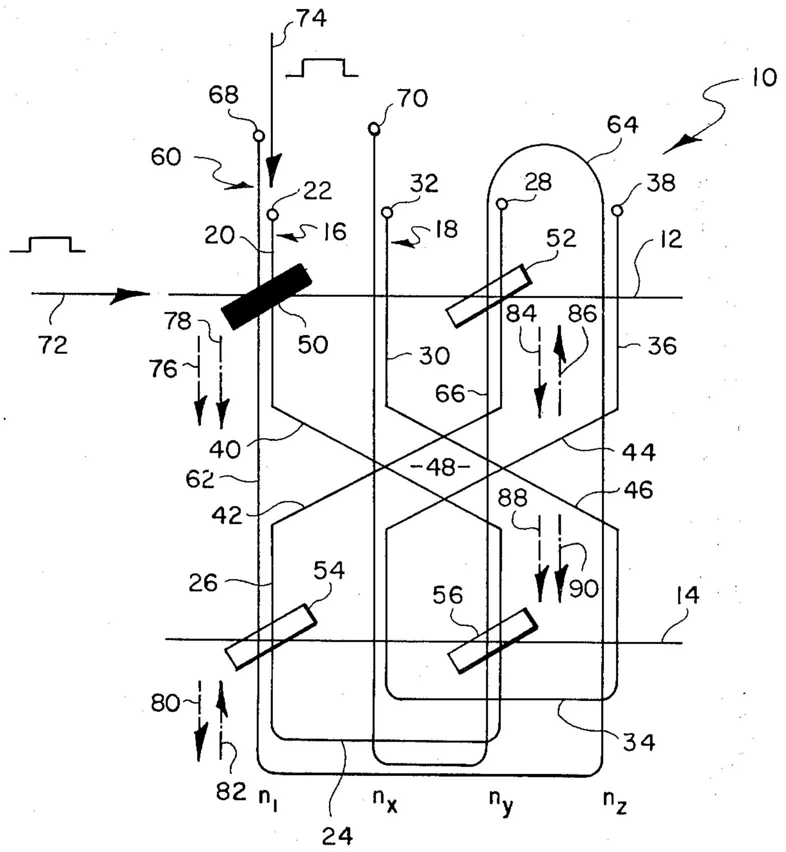
FIG. 1 is an enlarged and schematic view a magnetic core matrix of the invention.

One magnetic core matrix 10 of the invention is schematically illustrated by FIG. 1 with a plurality of word wires such as word wires 12 and 14 oriented in a generally X-axis row pattern. A plurality of digit wires such as digit wires 16 and 18 develop a generally y-axis columnar pattern. The digit wire y-axis columns $n_1$,$n_x$, $n_y$, and $n_z$ of the core matrix 10 of FIG. 1 are positioned substantially transverse to the word wire x-axis rows 12 and 14.

The digit wires 16 and 18 of the core matrix 10 develop the y-axis columnar pattern through an intricate physical arrangement.

Digit wire 16 has a first leg portion 20 extending from terminal 22 along y-axis column $n_1$, then generally diagonally from column $n_1$ to column $n_y$, and then along column $n_y$. A bight portion 24 of digit wire 16 is the transitional portion between the first leg portion 20 and a second leg portion 26 of the digit wire 16. The bight portion 24 spans from column $n_y$ to column $n_1$. The second leg portion 26 extends along column $n_1$ in a direction opposite to that of the first leg portion 20 of column $n_1$, then generally diagonally from column $n_1$ across the first leg portion to column $n_y$, and then along column $n_y$ to terminal 28.

Similarly, digit wire 18 has a first leg portion 30 extending from terminal 32 along y-axis column $n_x$, then generally diagonally from column $n_x$ to column $n_z$, then along column $n_z$ to a bight portion 34 that spans from column $n_z$ to column $n_x$. The bight portion 34 is the transitional portion between the first leg portion 30 and a second leg portion 36 of the digit wire 18. The second leg portion 36 extends along column $n_x$, then generally diagonally from column $n_x$ across the first leg portion 30 to column $n_z$, and then along column $n_z$ to terminal 38.

As shown by FIG. 1, the diagonal portions 40 and 42 of digit wire 16 and the diagonal portions 44 and 46 of digit wire 18 develop a double cross-over region 48 of the respective first leg portions and the respective second leg porttions which flip-flops the respective positions of the first and second leg portions on the columnar $n_1$ $n_x$ $n_y$ $n_z$ pattern. It is understood that the double cross-over region 48 can be periodic as will be described hereinafter. Similar memory cores 50, 52, 54, and 56 are positioned at selected intersections of the word wires 12 and 14 and the digit wires 16 and 18, and are threaded by the respective word and digit wires. It is understood that, although only selected memory cores are shown by FIG. 1; additional memory cores can be positioned at each or at selected ones of the intersections of the word and digit wires.

Figure 2:
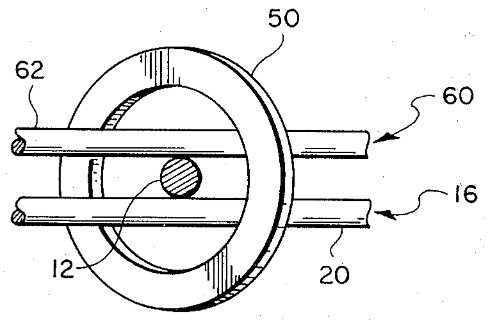
FIG. 2 is an enlarged, partly sectional and broken away view of a memory core of the invention of FIG. 1.

In FIG. 1, a continuous sense wire 60 is threaded through each of the memory cores, such as memory core 50 as shown by FIG. 2, in the following manner. A first sense wire leg portion 62 passes through the memory cores 50 and 54 along y-axis column $n_1$, then to and along column $n_z$ to a sense wire bight portion 64. The bight portion 64 spans from column $n_z$ to column $n_y$, and is the transitional portion between the first sense wire leg portion 62 and a second sense wire leg portion 66. The second sense wire leg portion 66 passes through memory cores 52 and 56 along column $n_y$, then to and along column $n_x$. Each of the sense wire leg portions 62 and 66 have respective terminals 68 and 70.

As schematically shown by FIG. 1, the magnetic core matrix 10 develops a plurality of digit wire y-axis columns in a series, which series commences with column $n_1$ and ends with columns $n_x$ $n_y$ $n_z$. Although only four digit wire y-axis columns are schematically shown, it is understood that a magnetic core matrix of the invention can have a greater number of columns which would also define a series commencing with column $n_1$ and ending with columns $n_x$ $n_y$ $n_z$.

Adjacent first leg portions 20 and 30 of respective digit wires 16 and 18 periodically flip-flop columnar positions with the respective second leg portions 26 and 36 through the transitional diagonal portions 40, 42, 44 and 46 which develop the double crossover region 48. Thus in FIG. 1 for example, first leg portion 20 of digit wire 16 on column $n_1$ and first leg portion 30 of digit wire 18 on column $n_x$ flip flop at the double crossover region 48 with the respective second leg portions 26 on column $n_y$ and 36 on column $n_z$ so that the first leg portions 20 and 30 are positioned along columns $n_y$ and $n_z$, respectively, and the second leg portions 26 and 36 are positioned along columns $n_1$ and $n_x$, respectively. However, there is no flip flop of the first and second sense wire leg portions 62 and 66, respectively, of the sense wire 60 at the double cross-over region 48.

FIG. 1 shows one example which is offered to assure a working understanding of the invention and is not to be interpreted as limiting the scope of the invention.

A half-select current as represented by word wire arrow 72 is provided to word wire 12, and a similar half-select current as represented by digit wire arrow 74 is provided to digit wire 16. The half-select currents in word wire 12 and digit wire 16 generate magnetic fields which are additive at memory core 50 so that memory core 50 is fully selected, as schematically illustrated by the black memory core 50, and therefore is driven to an opposite state to provide a desired output signal across the terminals 68 and 70 of sense wire 60. Since the generated magnetic fields are not additive at memory core 52, it is not fully selected. Therefore, memory core 52 remains in the same state, and no output signal is sensed across the terminals 68 and 70 of sense wire 60.

Figure 3:
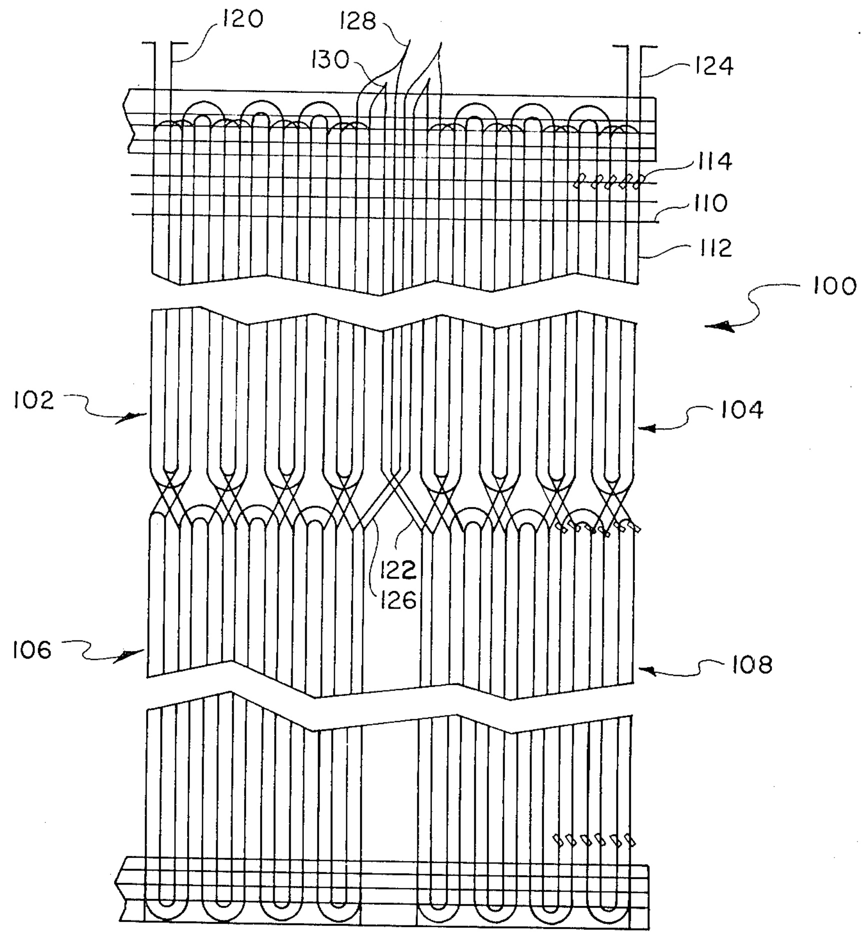
FIG. 3 is a plan view of a portion of a mass core memory of the invention.

In the invention as schematically illustrated by FIG. 1, delta noise, $\Delta\nu$, which is a known condition, is generated by the half-selected memory cores 52, 54 and 56. However, the delta noise that is generated is effectively cancelled by the sense wire 60 orientation with reference to the digit wire 16 so that actual delta noise generation summates to zero since at memory core 50 the sense wire leg portion 62 and the first leg portion 20 of digit wire 16 develop a $+\Delta\nu$ as schematically depicted by the cooperating dash arrow 76 and dot dash arrow 78 for the respective leg portions 62 and 20; at memory core 54 the sense wire leg portion 62 and the digit wire second leg portion 26 develop a $-\Delta\nu$ as schematically depicted by the opposing dash arrow 80 and dot-dash arrow 82 for the respective leg portions 62 and 26; at memory core 52 the sense wire leg portion 66 and the digit wire second leg portion 26 develop a $-\Delta\nu$ as schematically depicted by the opposing dash arrow 84 and dot-dash arrow 86 for the respective leg portions 66 and 26; and, at memory core 56 the sense wire leg portion 66 and the digit wire first leg portion 20 develop a $+\Delta\nu$ as schematically depicted by the cooperating dash arrow 88 and dot-dash arrow 90 for the respective leg portions 66 and 20. Therefore, a summation of the delta noise, $\Delta\nu$, at the memory cores $+\Delta\nu$ at memory core 50, $-\Delta\nu$ at memory core 54, $-\Delta\nu$ at memory core 52, and $+\Delta\nu$ at memory core 56 — results in zero delta noise in the magnetic core matrix of the invention. Each of the memory cores, such as 50, 52, 54, and 56, schematically represent a mass array of memory cores, such as is shown by FIG. 3, and which can include a plurality of memory cores, such as 114. However, the total number of memory cores, which are positioned at the selected intersections of the word wires and the digit wires as described hereinbefore, on either side of a double cross-over region interposed therebetween must be equal in number. For example, the total number of memory cores positioned on each side of the double cross-over region 48 as schematically represented by FIG. 1 are equal in number: two memory cores 50 and 52 on one side of the double cross-over region 48, and two memory cores 54 and 56 on the adjacent side of the double cross-over region.

Referring to FIG. 3, one form of magnetic core memory 100 of the invention includes a plurality of magnetic core matrices 102, 104, 106, and 108 generally arranged in rows and columns. Each magnetic core matrix has a plurality of similar word wires 110 oriented in a generally x-axis row pattern, and a plurality of similar digit wires 112 that develop a generally y-axis columnar pattern and are oriented in a paired and interwoven relationship with periodic double cross-over regions that flip-flop the respective first and second leg portions of the paired digit wires as previously described and schematically illustrated by FIG. 1. Similar memory cores 114 are positioned at selected intersections of the word wires 110 and the digit wires 112, and are threaded by the respective word and digit wires. In FIG. 3, not all word wires 110, digit wires 112, and memory cores 114 are shown for purposes of illustrative clarity. A first sense wire 120, which overlays the digit wires as illustrated, is threaded through each of the memory cores 114 of the magnetic core matrix 102, then passes diagonally at 122 to the diagonally adjacent magnetic core matrix 108 where the sense wire is threaded through each of the memory cores therein. A second sense wire 124 is threaded through each of the memory cores 114 of the magnetic core matrix 104, then passes diagonally at 126 to the diagonally adjacent magnetic core matrix 106 where the sense wire is threaded through each of the memory cores therein. Where it is necessary to splice a sense wire, the invention permits an easy splice to be completed at the edge of a magnetic core matrix such as splices 128 and 130 to sense wire 120.

Figure 4:
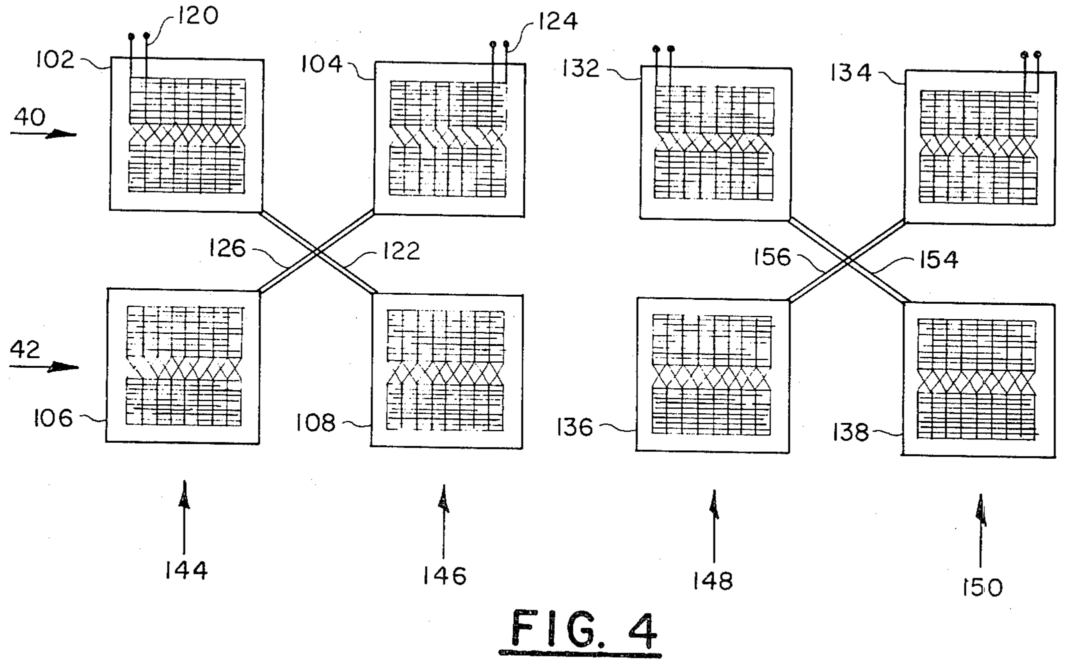
FIG. 4 is a schematic view of a mass core memory including the mass core memory portion of FIG. 3.

FIG. 4 more clearly illustrates, in a schematic manner, the magnetic core memory 100 of FIG. 3 with magnetic core matrices 102, 104, 106, and 108. It also illustrates additional magnetic core matrices 132, 134, 136, and 138 which are similar to the previously described magnetic core matrices 102, 104, 106, and 108. The core matrices of the magnetic core memory 100 are aligned in a pattern that generally defines rows and columns. Thus, magnetic core matrices 102, 104, 132, and 134 develop a row 140 while the remaining magnetic core matrices develop an additional row 142 that is adjacent to row 140; and, magnetic core matrices 102 and 106 develop a column 144 while the remaining paired magnetic core matrices 104 and 108, 132 and 136, and 134 and 138 develop respective columns 146, 148, and 150.

As shown by FIG. 3 and as previously described, magnetic core matrix 102 of row 140 and column 144 is electrically linked to magnetic core matrix 108 of row 142 and column 146 by the diagonal portion 122 of the sense wire 120. Similarly, magnetic core matrix 104 of row 140 and column 146 is linked to magnetic core matrix 106 of row 142 and column 144 by the diagonal portion 126 of the sense wire 124. Each of the remaining magnetic core matrices 132, 134, 136, and 138 are similarly linked to a diagonally adjacent magnetic core matrix by the diagonal portion, such as diagonal portions 154 and 156 of FIG. 4, of a respective sense wire. It is contemplated that the diagonally adjacent magnetic core matrices can be arranged in a geometric pattern other than the row-and-column geometric pattern schematically shown by FIG. 4.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A core memory matrix comprising:

a. a plurality of word wires positioned in adjacent rows and developing a row pattern.

b. a plurality of interwoven first and second digit wire loops including 1. respective first and second digit wire bights,
2. first and second legs of each of said first and second wire bights developing a columnar pattern transverse to said row pattern,
3. said legs positioned as adjacent pairs of said first legs and of said second legs,
4. a periodic double cross-over of said adjacent first legs and said adjacent second legs which flip-flops the positions of said legs of said first and second digit wire loops in said columnar pattern, c. a plurality of magnetic memory core having a magnetic memory core at each selected intersection of said word wires and said digit wire legs, said core threaded by one of said word wires and one of said digit wire legs, d. respective ones of said plurality of magnetic memory cores positioned on adjacent sides of each of said periodic double cross-over said respective ones of said cores on said adjacent sides being equal in number, and e. a continuous sense wire loop threaded through each magnetic core, said sense wire loop having a sense wire bight and first and second sense wire legs, said first sense wire leg threaded in alternate first and second directions along selected first ones of said digit wire columns developing a plurality of adjacent first sense wire leg pairs with one leg of each of said first sense wire leg pairs oriented in said first direction, said second sense wire leg threaded in said alternate first and second directions along selected second ones of siad digit wire columns developing a plurality of adjacent second sense wire leg pairs with one leg each of said second sense wire leg pairs oriented in said first direction, each of said first sense wire legs spaced apart from a paired first sense wire leg by an interjacent second sense wire leg pair.

2. The core memory matrix of claim 1 in which said row pattern is generally x-axis oriented and said columnar pattern is generally y-axis oriented.

3. The core memory matrix of claim 2 in which said x-axis oriented row pattern is generally perpendicular to said y-axis oriented columnar pattern.

4. The core memory matrix of claim 1 in which said first direction is opposite to said second direction.

5. The core memory matrix of claim 4 in which said first direction is diametrically opposite to said second direction.

6. The core memory matrix of claim 1 in which said y-axis oriented columnar pattern has at least $n_1\, n_x\, n_y\, n_z$ digit wire columns, said selected first ones commencing at $n_1$ to and including at least $n_z$ columns, and said selected second ones commencing at $n_x$ to and including at least $n_y$ columns.

7. The core memory matrix of claim 1 in which said y-axis oriented columnar pattern has $n_1 \ldots n_x\, n_y\, n_z$ digit wire columns, said selected first ones commencing at $n_1$ and being $n_1\, n_4\, n_5\, n_8\, n_9 \ldots n_z$ digit wire columns, and said selected second ones commencing at $n_2$ and being $n_2\, n_3\, n_6\, n_7 \ldots n_x\, n_6$ columns.

* * * * *